US008510662B1

(12) United States Patent
Haase et al.

(10) Patent No.: US 8,510,662 B1
(45) Date of Patent: Aug. 13, 2013

(54) EFFECTS FRAMEWORK FOR GUI COMPONENTS

(75) Inventors: Chet S. Haase, Pleasanton, CA (US); Hans E. Muller, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 574 days.

(21) Appl. No.: 11/475,520

(22) Filed: Jun. 26, 2006

Related U.S. Application Data

(60) Provisional application No. 60/694,527, filed on Jun. 27, 2005, provisional application No. 60/694,485, filed on Jun. 27, 2005.

(51) Int. Cl.
*G06F 3/00* (2006.01)

(52) U.S. Cl.
USPC ............................ 715/746; 715/765; 715/769

(58) Field of Classification Search
USPC ......................................... 715/746, 765, 769
See application file for complete search history.

(56) References Cited

U.S. PATENT DOCUMENTS

| | | | | |
|---|---|---|---|---|
| 5,202,961 A | * | 4/1993 | Mills et al. ..................... | 715/720 |
| 5,359,712 A | * | 10/1994 | Cohen et al. .................. | 715/723 |
| 5,428,730 A | * | 6/1995 | Baker et al. .................... | 715/740 |
| 5,764,226 A | * | 6/1998 | Consolatti et al. ............ | 715/747 |
| 5,767,835 A | * | 6/1998 | Obbink et al. ................. | 715/861 |
| 5,835,094 A | * | 11/1998 | Ermel et al. ................... | 715/848 |
| 5,838,326 A | * | 11/1998 | Card et al. ..................... | 715/775 |
| 5,880,729 A | * | 3/1999 | Johnston et al. .............. | 715/823 |
| 5,880,733 A | * | 3/1999 | Horvitz et al. ................ | 715/850 |
| 5,956,029 A | * | 9/1999 | Okada et al. .................. | 715/746 |
| 5,999,195 A | * | 12/1999 | Santangeli .................... | 345/473 |
| 6,081,270 A | * | 6/2000 | Berry et al. ................... | 345/419 |
| 6,134,547 A | * | 10/2000 | Huxley et al. ...................... | 1/1 |
| 6,404,441 B1 | * | 6/2002 | Chailleux ..................... | 715/704 |
| 6,460,040 B1 | * | 10/2002 | Burns .............................. | 707/10 |
| 6,573,915 B1 | * | 6/2003 | Sivan et al. ................... | 715/781 |
| 7,034,834 B2 | * | 4/2006 | Blanco et al. ................. | 345/473 |
| 7,506,267 B2 | * | 3/2009 | Baxter et al. ................. | 715/781 |
| 2003/0008266 A1 | * | 1/2003 | LoSasso et al. .............. | 434/118 |
| 2003/0052921 A1 | * | 3/2003 | Ulrich et al. ................. | 345/765 |
| 2004/0046792 A1 | * | 3/2004 | Coste et al. ................... | 345/763 |
| 2006/0150104 A1 | * | 7/2006 | Lira .............................. | 715/733 |
| 2008/0303828 A1 | * | 12/2008 | Marchant et al. ............. | 345/473 |

\* cited by examiner

*Primary Examiner* — Phenuel Salomon
(74) *Attorney, Agent, or Firm* — Martine Penilla Group, LLP

(57) ABSTRACT

Methods for rendering effects of graphical components of a graphical user interface are provided. One method includes defining a screen display having one or more components. The method also includes defining a start state for at least one of the one or more components and defining an end state for at least one of the one or more components. An operation of determining if a component identified for transition includes a defined start state and a defined end state is also provided. The method determines a transition type for the component that that has the defined start state and the defined end state and identifies an effect type based on the determined transition type. To render, the method includes (a) altering a graphics state at a time interval and (b) painting the component for the identified graphics state at the time interval. The method repeats (a)-(b) until the graphics state matches the defined end state. The component is then rendered at the defined end state using a particular defined transition effect.

11 Claims, 8 Drawing Sheets

EFFECTS FRAMEWORK FOR GUI COMPONENTS

CLAIM OF PRIORITY

This Application claims priority from U.S. Provisional Patent Application No. 60/694,527, filed on Jun. 27, 2005, entitled "FRAMEWORK FOR TRANSITION EFFECTS FOR GUI COMPONENTS", which is herein incorporated by reference. This Application also claims priority from U.S. Provisional Patent Application No. 60/694,485, filed on Jun. 27, 2005, entitled "AUTOMATED ANIMATED TRANSITIONS BETWEEN SCREENS OF A GUI APPLICATION", which is herein incorporated by reference.

CROSS REFERENCE TO RELATED APPLICATION

This Application is related to U.S. patent application Ser. No. 11/475,693, entitled "AUTOMATED ANIMATED TRANSITIONS BETWEEN SCREENS OF A GUI APPLICATION", filed on the same day as the instant application, and is herein incorporated by reference.

BACKGROUND

Developers face the tedious task of having to manually code animated transitions between screens. While these transitions provide a richer environment to operate in, the burden placed on the developers becomes a barrier to the utilization of the animated transitions. The developers must hardcode the effects that occur on components and the logic that makes them work. When multiple effects are considered, even more coding is required. Consequently, the use of animated transitions between screens is not as prevalent as would be otherwise.

Picture a typical forms-based application. The user is presented with a GUI consisting of various widgets such as text, text fields, buttons, list-boxes, and checkboxes, which they fill-out, select, and click appropriately. The user then clicks on the ever-present "Submit" button which usually results in this GUI disappearing and then, after some delay, being replaced by a completely different GUI experience. The new GUI presents more text fields, more information, more buttons, but mostly new items in different places.

Users usually puzzle over the new GUI for a bit, then proceed to fill out the information appropriately, click another Submit button, and thus continue on in their journey through the application. This application is typical an HTML-based web application, where the GUIs tend to be very static (and where the capabilities of the viewing application tend to be more limited than, say, a rich-client toolkit). But it is really the same in most applications, regardless of language and toolkit choice. It is simply the easiest and most obvious way for such applications to work; the user fills out the information needed by the server, they submit this info, the server processes the entry data, and then GUI displays the results and asks for more information, as appropriate.

The difficulty for the user is in constantly being presented with new GUIs that must be read to understand what action must be taken next. Sometimes, the user may be transitioned to a new screen, with little information as to why the user ended up at that page. Consequently, many of today's GUI navigation processes fail to provide users with the logical connection of who transitions occurred between states.

There exists a need to enable the use of animated transitions between screens in a simplified manner, in order to alleviate the burden currently imposed on developers.

SUMMARY

Embodiments of the present invention provide a framework for enabling automation of the animated transitions to simplify the programming required by the end user. Example methods of embodiments of the present invention are listed below.

In one embodiment, a method for enabling integration of effects graphics when rendering graphical displays associated with components of a transition panel, is disclosed. The method includes identifying effects code segments, where each effects code segment defines a predefined graphical effect that can be applied to components of the transition panel. The method then includes selecting a component of the transition panel. The component has a start state within the transition panel and an end state, and the selected component is assigned an effects code segment. Further, the method includes receiving one or more timed triggers to render state changes between the start state and the end state of the selected component. The rendering of state changes is performed in accordance with the assigned effects code segment.

In accordance with another embodiment, a method for rendering effects of graphical components of a graphical user interface (GUI), is disclosed. The method includes identifying a component of the GUI, and the component has a start state and a defined end state. The method then includes triggering access to an effects engine for each transition state of the component when the component transitions between the first state and the end state. The triggering is in response to one or more timer initiated calls received by the effects engine.

In one embodiment, the transitions framework of the present invention provides methods to allow applications to animate between the different states of the application to make a smoother and more logical flow between states. Instead of disjointed screens of an application where the transitions are abrupt erasures of the current screen followed by painting of an entirely new ones with radically different appearance, the features of the present invention enable the making of transitions more smooth by moving things around on the screen in a smooth fashion, so as to make it more obvious how these states connect to each other.

In yet another embodiment, features of the invention would enable a first screen to not disappear, but rather changed smoothly into the second. For example, a text entry field and search button (for example) could move and resize themselves up to the top of the screen while the search results faded or moved into view. With this functionality, chances are that a user would automatically know where to go to enter a new search, as the user saw that component move up to the top, so they would know where that entry field is on the new GUI. And the connection between the old GUI of the entry field and the new GUI of the entry field, plus the results were made in a very solid way, so that it would be much more clear that the new page information came from a prior page.

In still another embodiment, a method for rendering effects of graphical components of a graphical user interface is provided. The method includes defining a screen display having one or more components. Then the method includes defining a start state for at least one of the one or more components and defining an end state for at least one of the one or more components. Then, determining if a component identified for transition includes a defined start state and a defined end state.

The method then determines a transition type for the component that has the defined start state and the defined end state and identifies an effect type based on the determined transition type. To render, the method includes (a) altering a graphics state at a time interval and (b) painting the component for the identified graphics state at the time interval. Then, the method repeats (a)-(b) until the graphics state matches the defined end state. The component is then rendered at the defined end state.

Other exemplary embodiments defined part of this invention, and such embodiments are described with reference to the attached figures and written description.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Figure 1:
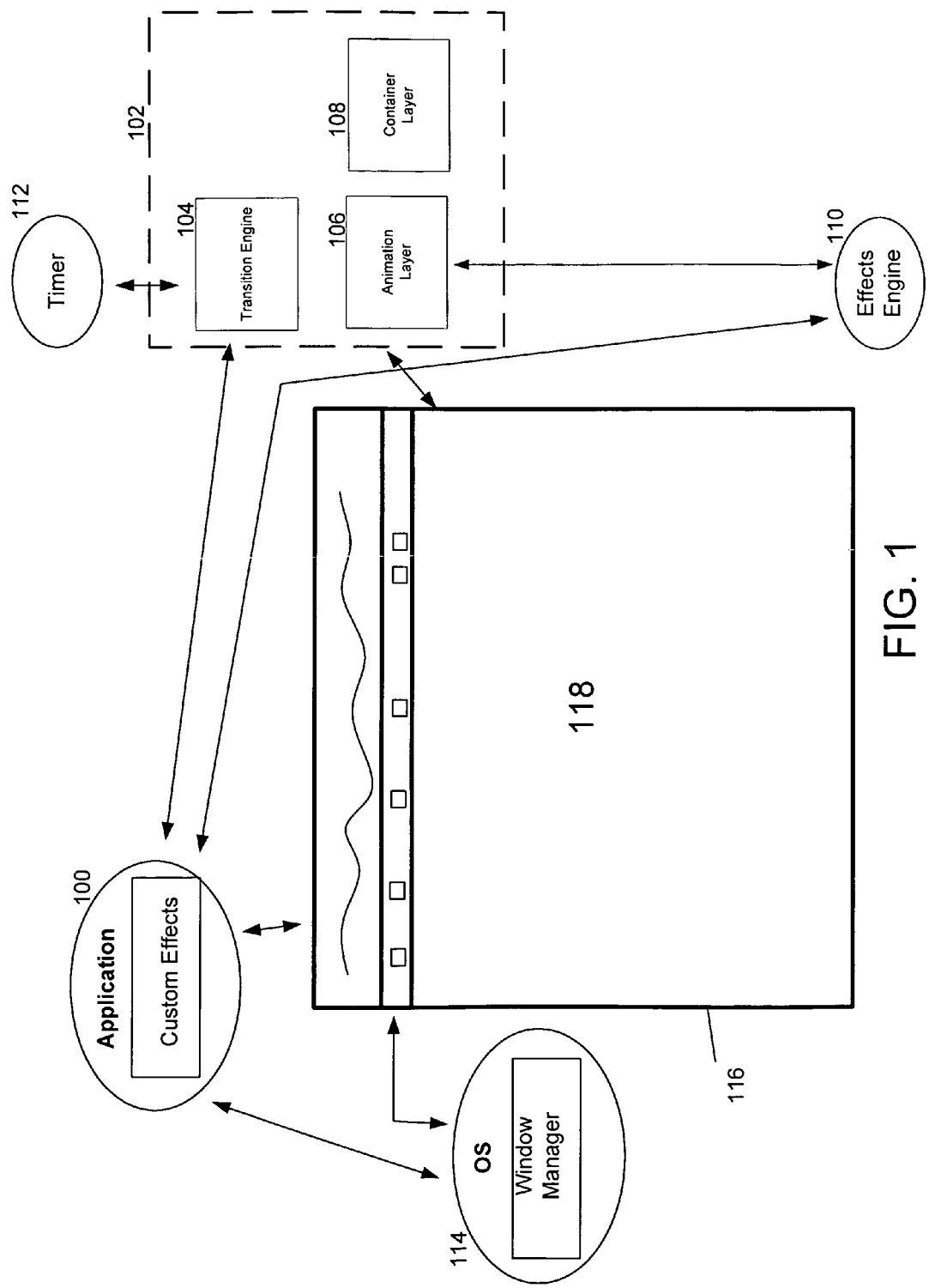
FIG. 1 is a simplified schematic diagram illustrating an animation transition system in accordance with one embodiment of the invention.

An invention is described for a framework simplifying the employment of animated transitions between screens of an application. It will be obvious, however, to one skilled in the art, that the present invention may be practiced without some or all of these specific details. In other instances, well known process operations have not been described in detail in order not to unnecessarily obscure the present invention.

In one embodiment, animated transitions are provided for graphic user interface (GUI) libraries. The animated transitions provide a way to keep users more connected to an application as it changes states. As a feature of this invention, applications are allowed to change states smoothly from one state to another, such as for example, moving a text field out of the way and fading in a table of data. This operation paradigm is contrary to most applications today, especially HTML-based applications, which simply erase the current state of the application and then draw in the new state. By using effects such as transition, scaling, and fading, applications can make graphical user interface (GUI) transitions easier and, in turn, make the users more productive. However, these effects have not been able to be implemented in a manner that is user-friendly. In particular, assembling the possible effects into a system that actually transitions between application states can be very involved. A developer will have to manually code each effect, which becomes tedious. Additionally, when many components have transitions showing special effects per screen, each of the components would have to be manually set up and the transitions for each of these components would have to be manually set up.

The embodiments described herein automate the transition process for entire screens of an application, thereby making these applications easier to write for the developer. For example, in one embodiment, instead of having to manually animate a transition of a button from one area to another area of the GUI, or a text field from a first size to a second size, or to fade in a table or some other component, the embodiments described herein allow a developer or user to declare the elements of each screen of an application Then, the system can automate the transitions between screens. That is, if a user declares a button to be in one position on one screen and a different position on the next screen, then the system described herein would automate the animated transition from the first to the second position. In one embodiment, the effect applied to the button can be specified and thereafter rendered by an effects engine. A framework for supporting effects in a generic, extensible, and pluggable way such that applications do not need to manually write the code to handle the animation effects that are used is described in more detail below. As will be described further, the animated transition system automates transitions between entire states of an application.

The system functions by having the developer declare separate screens of the applications. In one embodiment, this can be achieved in any way that is compatible with the code running the actual application. For example, there may be a system that allows the user to describe the GUI screens declaratively, an XML or some other persistent format, that the application could later read in. Alternatively, the screens may be created directly in application code, either statically, i.e., hard-coded in the application, or dynamically, i.e., being generated on-the-fly. These separate screens are defined as a set of GUI widgets or components that make up that screen, including position, size, orientation, and graphics state (such as color) of each widget.

At runtime, the application would tell the animated transition system to transition from one of these screens to another. The system would then determine:

A) which GUI elements existed in both screens;

B) which GUI elements exist in the first screen but not in the second; and

C) which GUI elements exist in the second screen but not in the first.

Each of the above three situations are handled as follows:

A) GUI elements that exist in both screens would animate into their new positions/orientations/sizes/states. If the elements did not change position/size/orientation/state between screens, they may simply stay put during a transition. It should be appreciated that it is possible to have effects operate transiently on elements, such as sparkling or fading out and fading back in.

B) GUI elements that are in the first screen but not the second must transition out of the application view. This can be done in various ways, depending on the effect desired. For example, widgets can simply fade out, move off the screen in some direction, or scale in or out and disappear, or some combination of these effects.

C) For widgets that are in the second screen but not the first, these widgets must appear in some way. This is similar, but in reverse, to the techniques mentioned above in item (B). In one embodiment, a widget may simply fade into place.

It should be appreciated that one advantage of this system is that the larger idea of animating between application states can be accomplished much easier than it could be manually animating each widget. Having a system to handle all of the tedious details, such as the animation timing, the effects, the automatic placement/removal of widgets, etc. enables developers to more easily incorporate transitions into an application and at the same time allows the developers more time for application development work.

FIG. 1 is a simplified schematic diagram illustrating an animation transition system in accordance with one embodiment of the invention. The animation transition system 102 includes transition engine 104, animation layer 106, and container layer 108. In one embodiment, animation layer 106 and container layer 108 are each buffers. Animation transition system is in communication with effects engine 110. In one embodiment, effects engine 110 includes a library of component effects that may be applied to components within transition panel 118. This library of component effects includes fading, spinning, rotating, sparkling, and any other suitable animation effect. Application 100 will control the display on GUI 116. Transition panel 118 within GUI 116 is where the animated effects will occur as directed by transition system 102 and the other components listed herein. One skilled in the art will appreciate that operating system 114, through a window manager may control the windows within transition panel 118.

Timer 112 is used to trigger callbacks into the transition engine 104 at pre-determined intervals in order to trigger an effect to render itself during a transition. In one embodiment of the invention, when a transition is initiated, transition engine 104 will identify a start state of the components within transition panel 118. The transition engine 104 then signals to the application to clear the previous screen and the application sets up a next screen, which will be an end state. Thus, transition system 102 now has a beginning state and an end state for all the components within the transition panel. Timer 112 is then initiated and will call back into transition engine 104 at regular intervals. At each interval, also referred to as a timing event, transition system 102 will communicate with effects engine 110 to have a component render itself with its effect into the animation layer buffer 106.

For each timing event, this will continue until the transition has completed to the end state. At the end state, animation layer 106 will then switch to container layer 108, which contains the end state. Thus, the transition to the end/final state will go unnoticed by the user. That is, the transitions from each timing event end with an end state being displayed on transition panel 118. This end state is identical to the state contained within container layer 108.

Still referring to FIG. 1, effects engine 110 performs calculations in order to apply the effect to a component being displayed within transition panel 118. In one embodiment, effects engine 110 contains a library of effects that may be used upon the GUI components. For example, effects such as spinning, rotating, pulsating, or any other suitable effect capable of being displayed within transition panel 118, may be applied according to the calculations performed by effects engine 110. Once the calculations are completed, the effects engine renders into the animation layer 106 for each component being rendered. In essence, timer 112 calls back to transition engine 104, which then triggers effect engine 110 to render into animation layer 106. The rendered image into animation layer 106 is then displayed within transition panel 118. This process is repeated until the end effect is obtained and thereafter the image may be refreshed from container layer 108.

FIGS. 2A through 2E illustrate a graphical user interface having a transition panel in which components are transitioning through animated effects in accordance with one embodiment of the invention. Graphical user interface 116 includes transition panel 118 where the animated transitions take place. Within transition panel 118, text box 120, text 122 and component 124 exist. Moving from FIG. 2A to FIG. 2B, it is illustrated that text 122 and component 124 have moved, while Table 126 is being faded into the transition panel 118. Here, text 122 is rotating and component 124 is moving towards the top of transition panel 118. Proceeding to FIG. 2C, it should be appreciated that text 122 has rotated to a new position, Table 126 has transitioned from a faded-in state to a full-on state, and text box 120 has moved up.

Figure 2A:
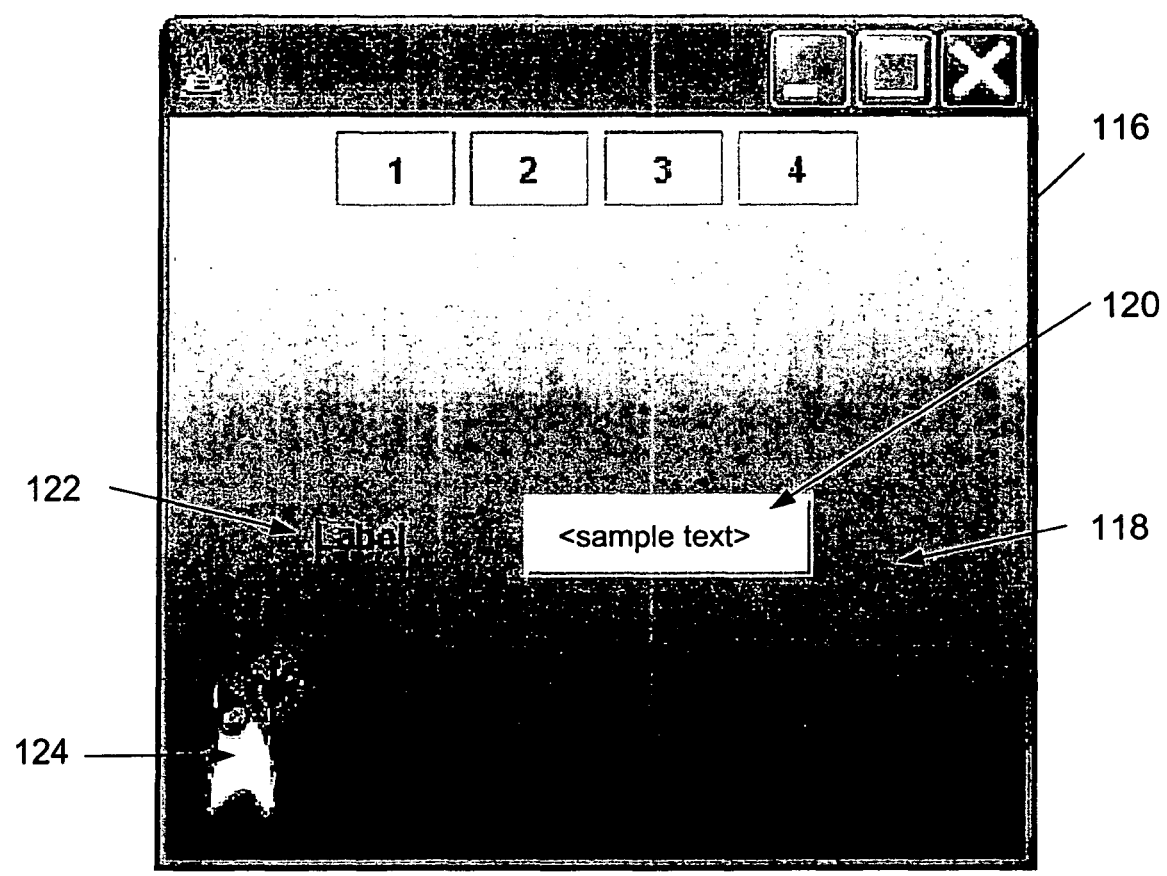
FIGS. 2A through 2E illustrate a graphical user interface having a transition panel in which components are transitioning through animated effects in accordance with one embodiment of the invention.
Figure 2B:
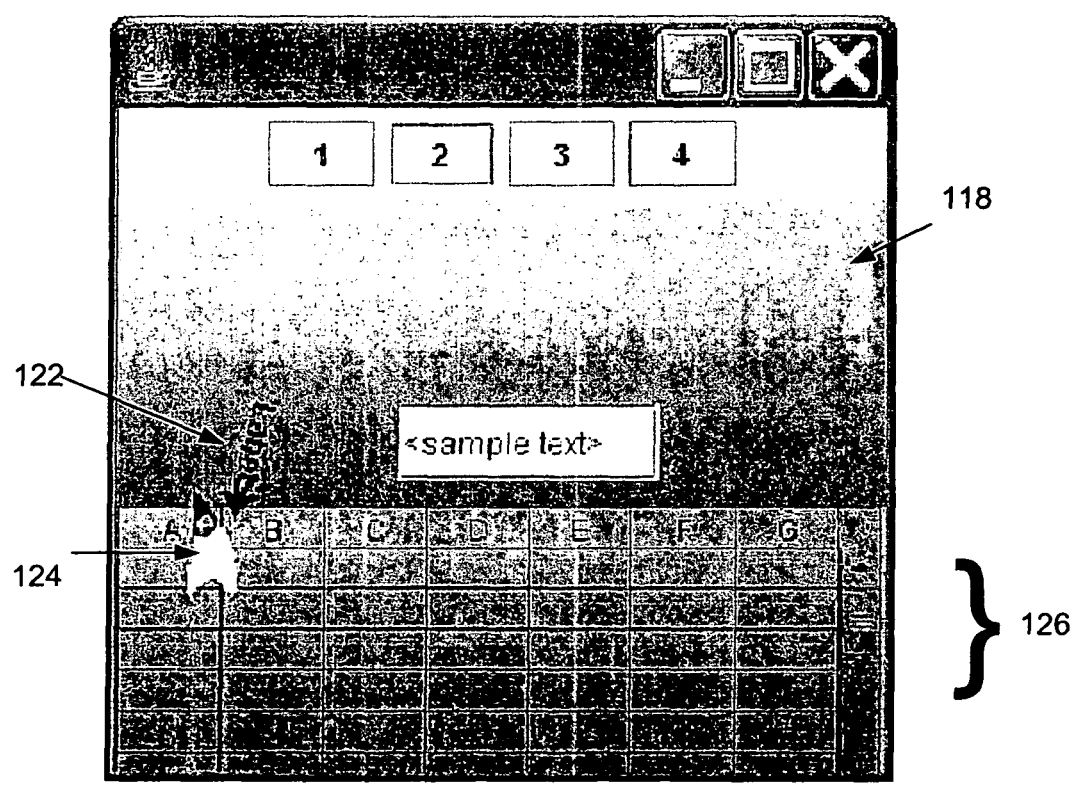
Figure 2C:
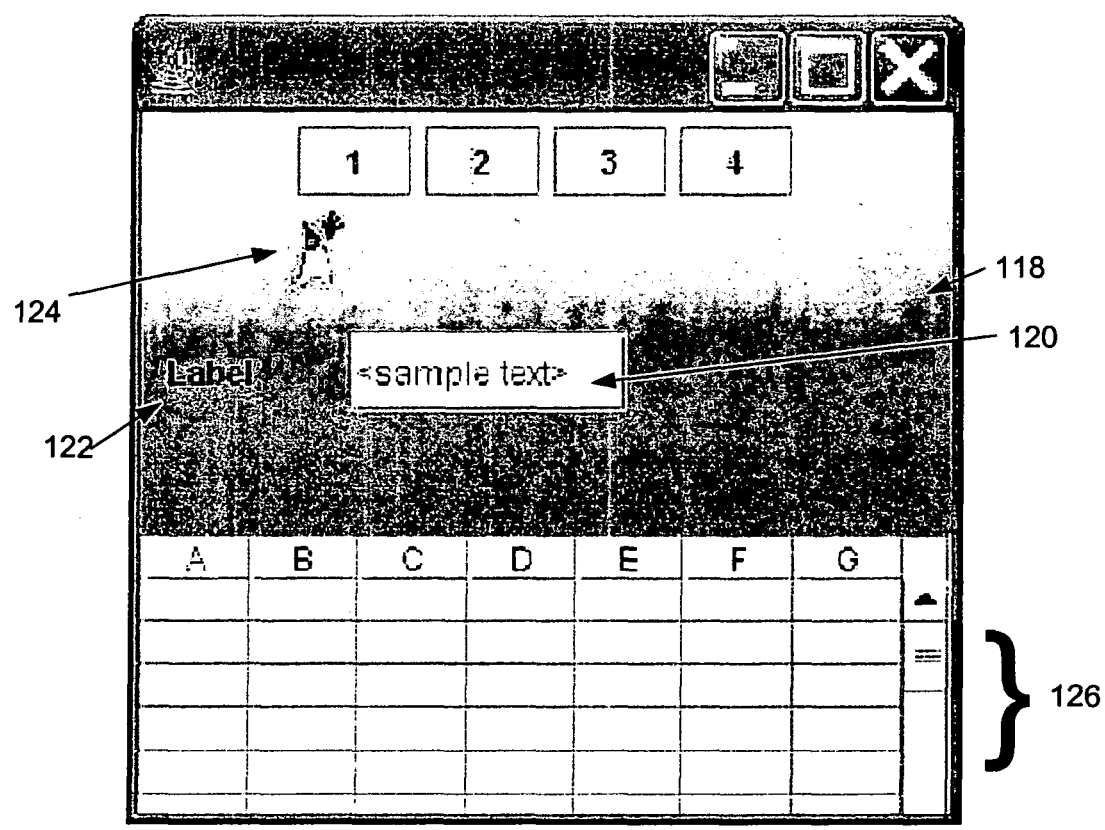
Figure 2D:
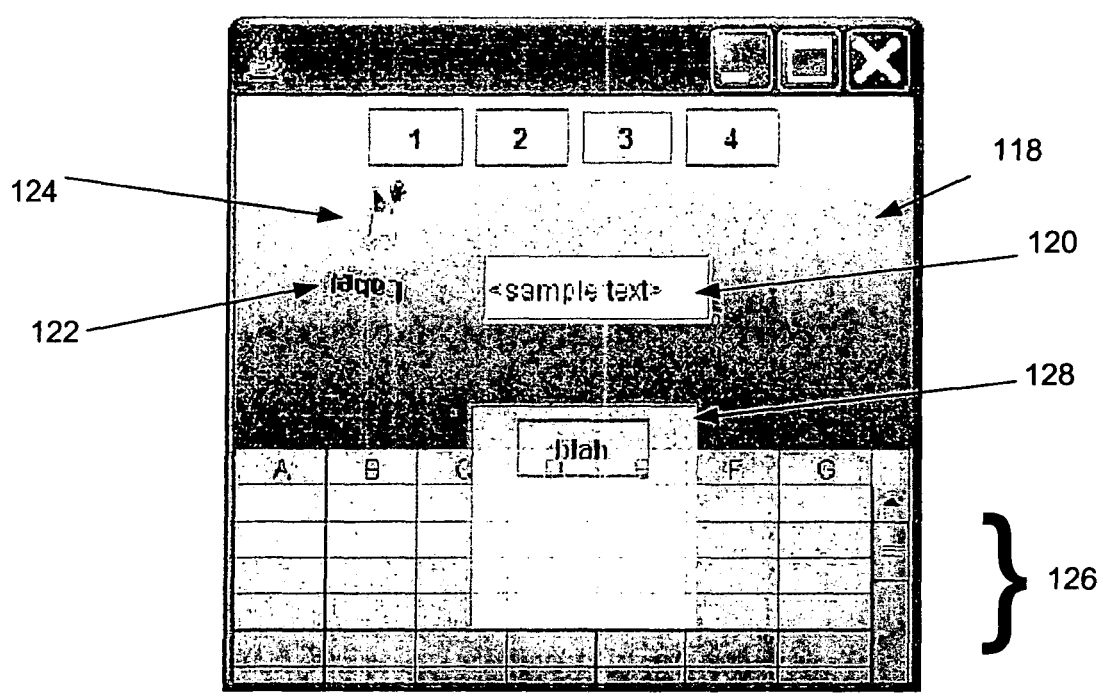
Figure 2E:
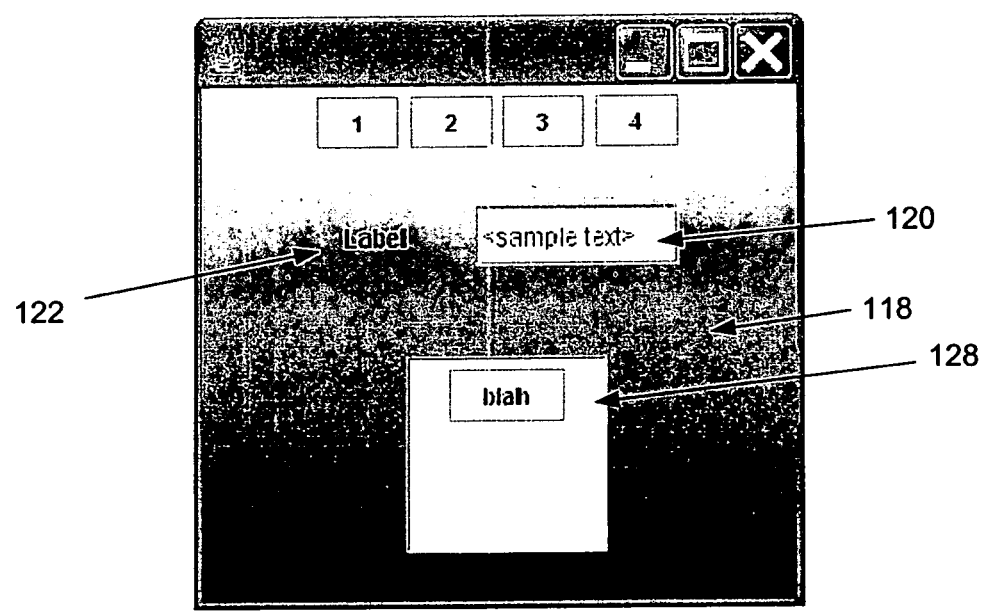

In addition, component 124 has moved from a bottom region within transition panel 118 to a top region. Moving on to FIG. 2D, additional animated transitions are taking effect in that box 128 is being faded in over the region previously occupied by Table 126, which is being faded out. Text 122 is again being rotated and moved while component 124 is being faded out. FIG. 2E illustrates a transition from FIG. 2D where box 128 has been fully faded in, text box 120 has moved from the previous position in FIG. 2D, component 124 has been completely fade out, and text 122 has rotated to a new position within transition panel 118.

Figure 3:
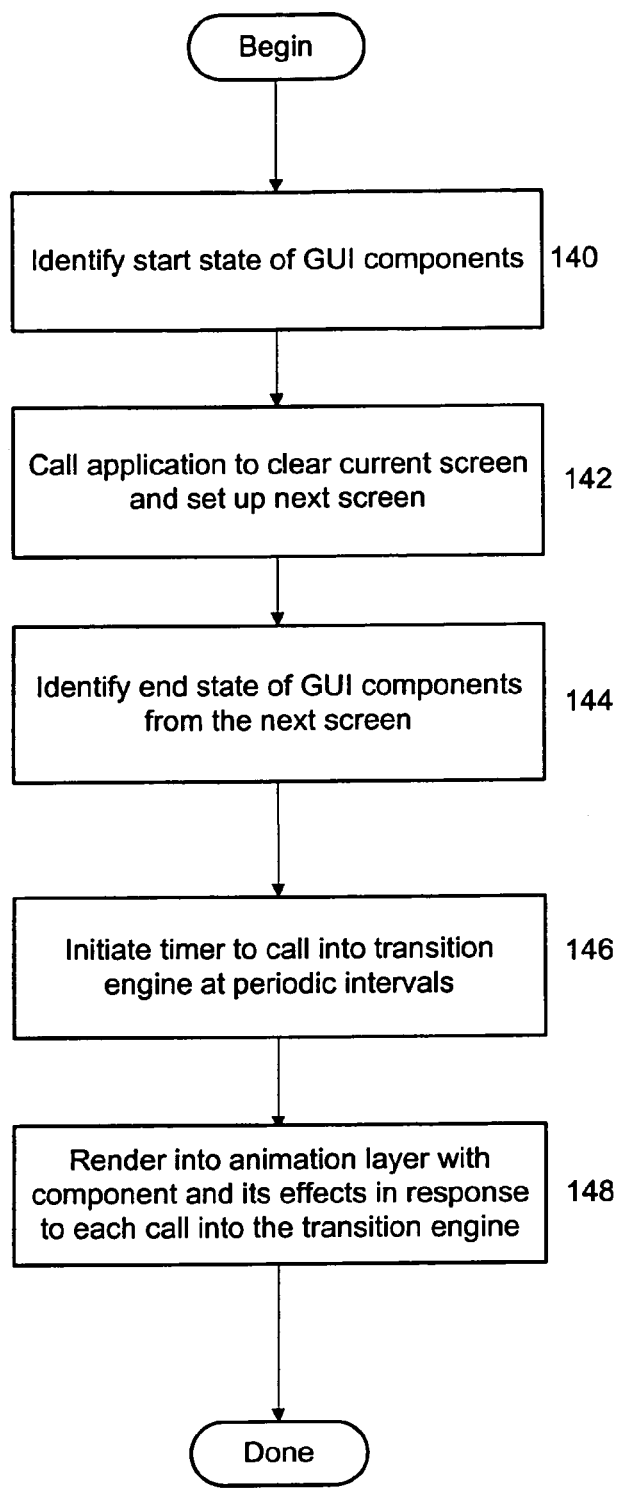
FIG. 3 is a flowchart diagram illustrating the method operations for automatically generating animated transitions between graphical user interface screens in accordance with one embodiment of the invention.

FIG. 3 is a flowchart diagram illustrating the method operations for automatically generating animated transitions between graphical user interface screens in accordance with one embodiment of the invention. The method initiates with operation 140 where the start state of GUI components are identified. The start state includes the location, orientation, etc., of the component within the transition panel. In operation 142, the transition engine 104 calls into the application to clear the current screen and set up the next screen. As a result, the transition engine obtains the end state of the GUI components within the transition panel in operation 144. Accordingly, the start and end state of the components are now known and the transition engine 104 can cause the rendering of the transition states as described below. Timer logic is then initiated in operation 146. The timer logic calculates elapsed time in one embodiment, and at periodic intervals, the timer logic calls into the transition engine.

The transition engine will then call the effects engine to render into the animation layer with the component and its effects. The animation layer then displays the rendered image within the transition panel. At each call into the transition engine, the effects engine will render into the animation layer in order to display the GUI components and present an animated transition from the start state to the end state.

Thus, the embodiments described herein enable screen transitions with animated transition effects to be easily incorporated into graphical user interfaces without burdening developers to manually code each effect. Through the embodiments described above, the transition engine identifies before and after states for each component involved in a transition. The transition engine then associates an effect with each component. A timer is started by the transition engine and for each timing event the transition engine directs each effect to render itself through an animation layer into the graphical user interface. It should be appreciated that the animation layer enables transitions to be visible during the transition time, however, after the transition period has ended the animation layer becomes invisible and the container layer, which is the buffer where the components actually live, is used as a source for the image data to be displayed. This split allows the embodiments described above to validate components in after screen while keeping that GUI hidden until the transition is complete.

Effects Framework

The animated transitions framework depends on an effects framework to perform all of the animated rendering for each individual component. As discussed with reference to FIG. 1 above, the transitions framework is responsible for setting up and running the animation. The actual painting of the components is handed off to an effects framework.

The usage of effects for transitions is as follows:
A. ComponentState: This data structure captures information about each component in its states in the current and next screens of the application; these states are used to select and run the rendering effects appropriately.
B. Transition type: In one embodiment, each component has one of three transition types for any given transition; this transition type will determine the effect that is applied to the component during the transition. Transition types can be inferred from the information in the ComponentStates.
C. Effect definition: There are some standard effects defined by the framework for common actions. The framework also allows users to define custom effects to get custom rendering behavior during the animation. Additionally, the framework allows composite effects, which are combinations of standard or custom effects.
D. Effect Selection: Once the transition type for each component is known, the system chooses an appropriate effect for each component.
E. Rendering: The transition animation consists of a series of pictures that are painted and displayed to the screen that show a smooth movement between the two screens of the animation. The transition framework discussed previously handles running the animation, creating the image where the animation will be painted, and displaying the animation images to the screen. But for each component being painted for each animation frame, the transition framework will call upon the effect chosen for the component to paint the component appropriately.

A. Component State

During the creation of any given transition, the animated transitions framework needs to record information about the components used in the current and next screens; it does so by creating ComponentState objects for each component. This data structure holds the component itself as well as information about the position, size, orientation, and other attributes of the component for each of the screens. Once the transition framework has recorded all of the information for both screens, it can ask the effects framework to choose effects appropriate for each of the component states, as described below in "Effect Selection".

B. Transition Type

In one embodiment, three different transition types are provide to the effects framework:
Changing: This type of transition is used on components that exist in both screens of the transition; the components may change position, size, or orientation, but they are present in some state in both screens.
Appearing: This type of transition is used on components that do not exist on the first screen of the transition, but do exist on the second screen, thus they "appear" as part of the transition from the first to the second screen.
Disappearing: This transition is the opposite of the Appearing transition; it is used on components that exist on the first screen but not on the second. These components "disappear" as part of the transition from the first to the second screen.

The transition framework sets up the information for all of the components involved in the transition between two screens; and defines, when it is ready to start the animation, which transition type each component will be using. For example, the transition framework defines that some button will be moving and resizing during the transition, some label will be staying in place, some table will be appearing and some text field will be disappearing. After that has been determined for each component, the appropriate effects are assigned to each component based on the transition type.

C. Effect Definition

In one embodiment, three categories of effects are provided to the effects framework: built-in effects, custom effects, and composite effects. Others can, of course, be used or defined, depending on the desired effects.

(i). Built-in Effects

Many effects are so useful in transitions that they should be available to all users of the framework, so the framework defines several such canonical effects:
Move: This effect renders the component in positions that vary between the starting and ending positions of the component in the two screens.
Scale: This effect renders the component by resizing it between the starting and ending sizes of the component in the two screens.
FadeIn: This effect renders the component in varying degrees of translucency from invisible to completely opaque, as the component fades into view between the current and next screen.
FadeOut: This is the opposite of the FadeIn effect, rendering the component between completely opaque and invisible as the transition runs between the current and next screen.
Rotate: This effect can be used to spin a component from one orientation to another specified in terms of rotation degrees and a center of rotation.

(ii) Custom Effects

Developers can subclass from ComponentEffect, override the two methods setup( ) and paint( ) and create an effect which performs custom rendering during the transition. For example, an effect could be created for a component that is in the first screen but not the second where the component smoothly moves out of the window instead of simply fading away.

(iii) Composite Effects

Developers can also combine effects into one single effect used during transitions to get more interesting and complex rendering. For example, the search engine application discussed in the transitions framework section above would need a composite effect that both moved and scaled the button and text field.

D. Effect Selection

Once the transition framework is done storing the information for each component in each screen, the effects framework has enough information to determine the effects that are appropriate for each component during the transition. It does this by first determining the transition type for each component, which is easily done based on whether each ComponentState has both start and end data, or whether it has only one or the other. Once the type of effect needed is known, the transition framework checks to see whether there is a custom effect of this type for this component. This is done by calling a static method in ComponentEffect that checks a global cache based on the component and the transition type. If no such custom effect exists, a default effect is chosen based on the transition type.

E. Rendering

Once all of the above operations have taken place, it is time to run the transition animation. The transition framework handles the actual running of the animation, but for each form of the animation, it calls into the effects framework to perform the appropriate rendering for each component. For each effect active in the transition, the transition framework calls the effects setup( )method, which sets the graphics state for rendering according to the current fraction elapsed of the animation, and then the paint( )method, which performs the rendering of the component with the given effect.

For example, a FadeOut effect would set the AlphaComposite state of the Graphics2D object in its setup( ) call, and would then simply draw the component with that Graphics object during the paint( )method.

There are some aspects about the Effects framework and how it accomplishes its tasks efficiently. First of all, performance is always a consideration when doing any rendering operation. If any screen transition consisted of many complicated components, each of which needed to be re-rendered on every call, then we might well run into performance issues that prevented a smooth transition animation. But note that many of the effects do nothing more than render the same exact component in a different position, or with a different AlphaComposite, or with other attributes that do not affect the internal layout of the component.

For example, if we need to move a button from one location to another between screens, we could certainly re-render the button within the Move effect for every frame of the transition animation. But we could also take a snapshot image of the button and simply copy that image to a different location during the animation.

It should be appreciated that the embodiments described herein may be utilized with any object oriented programming language. Additionally, the above described embodiments may be incorporated into a desk top environment or a hand-held/portable computing environment. In order to simplify the approach to animated transitions, a framework for "Component Effects" which gives developers the ability to specify which effects should act upon components in certain situations, or even to define their own custom effects has also been provided. In one embodiment, the ability to subclass and override Effects behavior means that application developers can define custom effects, or even custom compositions of other effects, and a system that uses the Effects framework will automatically use the developer's approach appropriately.

Figure 4:
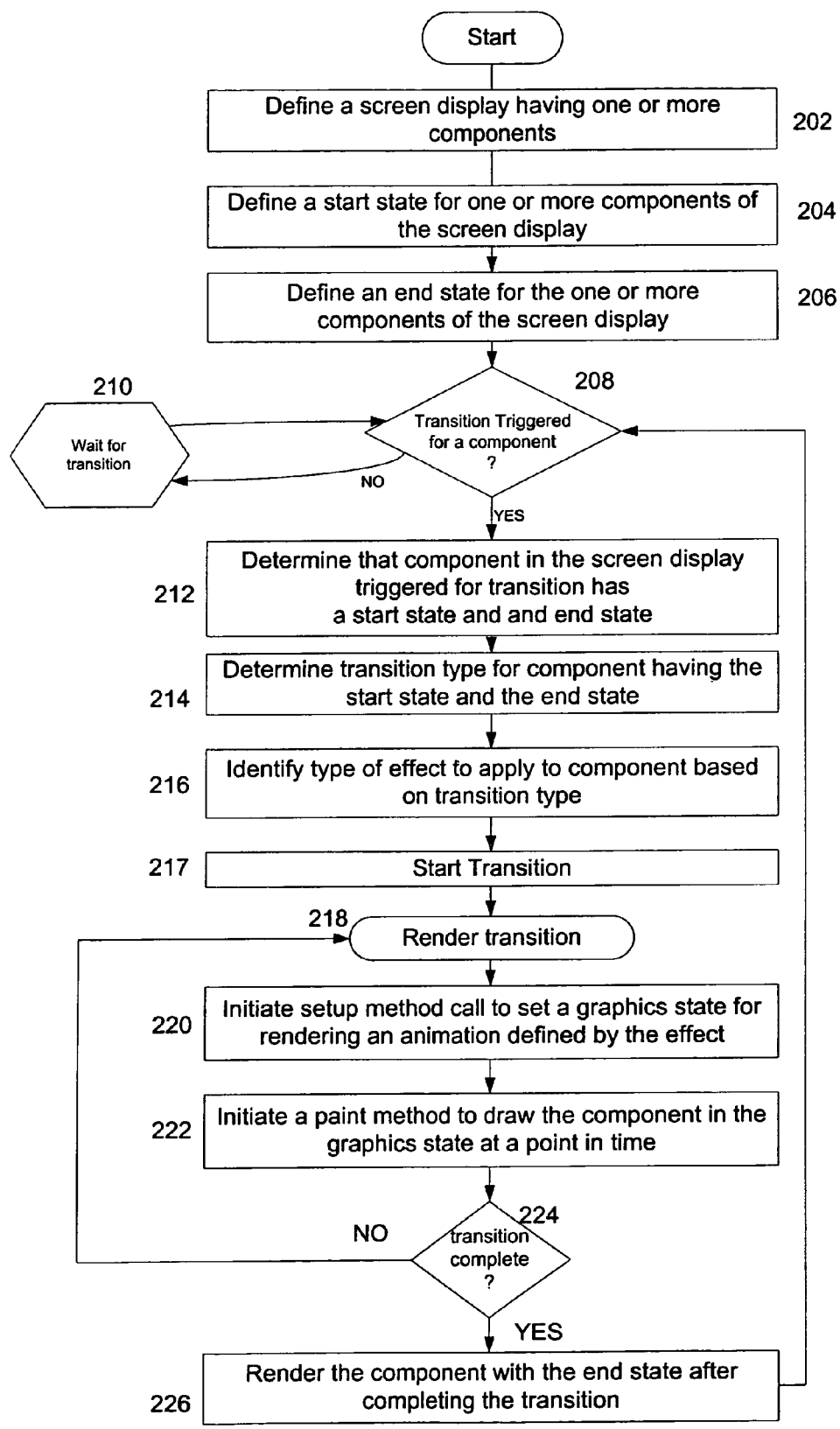
FIG. 4 illustrates an example process for rendering a particular effect during a transition, in accordance with one embodiment of the invention.

FIG. 4 illustrates another example of rendering a transition using a particular effect, in accordance with one embodiment of the present invention. The method begins at operation 202, where a screen type is defined. The screen may be defined to have any number of components. As used herein, components means any type of text, graphic, format, icon, character, image, video, object, organization of an object, pointer indicator, or a combination of one or more of these features. For ease of reference, the components identified in FIGS. 2A-2E may represent example components. Certain components, if they are to transition, will require that they be associated or assigned a start state. In operation 204, a start state may be assigned to a particular component, although not all components need to be assigned a start state (e.g., if they are not designed to transition).

In operation 206, a component may also be assigned an end state, similarly to how a start state is assigned.

In operation 208, a decision operation is processed, where it is determined that a transition is to occur for a particular component. For clarity, not all components will transition, and thus, in one embodiment, a determination will be made in operation 208. If no transition has been detected or triggered, the method will move to operation 210 where the system will wait to apply the transition processing when a transition is desired. If a transition is detected, the method moves to operation 212, where it is determined if a component identified for transition has a start state and an end state. If it has, the method will move to operation 214, where a transition type is determined. Based on the transition type, as defined above, a type of effect to apply to the component is identified in operation 216. In operation 217, an aspect of the transition process is started.

The method then moves to operation 218, where the transition is rendered. In this routine, the method moves through operations 220 and 222 a number of times, during a particular transition, so that an effect can be displayed over a period of time. The transition may be gradual, so the user has a better understanding as to how the screen is changing. In operation 220, a setup method is called to identify a graphics state for the rendering of an animation defined by the effect. In operation 222, a paint method is called to draw the component in the graphic states during the animation routine. If the duration of the transition is complete, as determined in operation 224, the method moves to operation 226, where the final state of the component is drawn, which is the end state. In this embodiment, the intermediate states are not drawn, but alternatively, animation is performed over time between the start state and the end states. If the transition is not complete, the process loops back to operation 218 where the render transition process resumes.

This process is only exemplary in nature, and the steps can be processed in slightly different order or without performing each step. In some circumstances, some steps may be omitted and some steps may be added, so long as the transition operations are performed, in accordance with the context of effect transitions described herein.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for rendering effects of graphical components of a graphical user interface (GUI), comprising:
   identifying a graphical component of the GUI, the identified graphical component having a start state and a defined end state, wherein the graphical component is a GUI widget;
   accessing an effects engine for each transition state of the identified graphical component when the identified graphical component transitions between the first state and the end state, the accessing being in response to one or more timer initiated calls received by the effects engine, wherein the identified graphical component undergoes one or more transition states, and each transition state is determined by the identified graphical component and the start state and the defined end state of the identified graphical component; and
   assigning the rendering of each transition state to an animation layer, the animation layer storing each transition state change for display on the transition panel; and
   assigning data associated with the end state to a container layer, wherein state changes in the animation layer proceed until the state changes in the animation layer match the end state in the container layer, and wherein the animation layer and the container layer are separate buffers.

2. The method for rendering effects of graphical components of a graphical user interface (GUI) as recited in claim 1, wherein the effects engine is configured to execute one of predefined transitions or custom transitions.

3. The method for rendering effects of graphical components of a graphical user interface (GUI) as recited in claim 1, wherein the GUI has a transition panel for displaying the component, the transition panel being associated with a container layer for storing the end sate and the animation layer further storing data associated with each transition between the start state and the end state of the component.

4. The method for rendering effects of graphical components of a graphical user interface (GUI), as recited in claim 1, wherein each of the predefined transitions and custom transitions is associated with one of custom effects or standard effects by a transition engine.

5. The method for rendering effects of graphical components of a graphical user interface (GUI), as recited in claim 1, wherein the timer initiated calls are received from a transition effects framework, the transition effects framework being in communication with a timer, the timer being called by the transition effects framework when transitions in state are to be trigged for rendering of state changes between the start state and the end state.

6. A method for enabling integration of effects graphics when rendering graphical displays associated with components of a transition panel, comprising:
   identifying effects code segments, each effects code segment defining a predefined graphical transition effect that can be applied to components of the transition panel;
   selecting a graphical component of the transition panel, the graphical component having a start state within the transition panel and an end state, the selected graphical component being assigned an effects code segment, wherein the graphical component is a widget in a graphical user interface;
   receiving one or more timed triggers to render state changes between the start state and the end state of the selected graphical component, the rendering of state changes being performed in accordance with the assigned effects code segment during each timed trigger, such that the assigned effects code segment is determined by the selected graphical component and the start state and the end state of the selected component; and
   assigning the rendering of the state changes to an animation layer, the animation layer holding the state changes for display on the transition panel; and
   assigning data associated with the end state to a container layer, wherein the state changes in the animation layer proceed until the state changes in the animation layer match the end state in the container layer, and wherein the animation layer and the container layer are separate buffers.

7. The method for enabling integration of effects graphics when rendering graphical displays associated with components of a transition panel, as recited in claim 6, wherein the predefined graphical effect is assigned to the graphic component by a transition engine and identified by the effect code segments are one of custom effects or standard effects.

8. The method for enabling integration of effects graphics when rendering graphical displays associated with components of a transition panel, as recited in claim 6, wherein the timed triggers are received from a transition effects framework, the transition effects framework being in communication with a timer framework, the timer framework being called by the transition effects framework when transitions in state are to be triggered for rendering of the state changes between the start state and the end state.

9. A method for rendering effects of graphical components of a graphical user interface (GUI), comprising:
   defining a screen display having one or more graphical components, wherein the graphical components are widgets in a graphical user interface;
   defining a start state for at least one of the one or more graphical components;
   defining an end state for at least one of the one or more graphical components;
   determining if a graphical component identified for transition includes a defined start state and a defined end state;
   determining a transition type for the graphical component that has the defined start state and the defined end state, the transition type defined by the graphical component and the start state and the end state of the graphical component;
   identifying an effect type based on the determined transition type;
   rendering the transition into an animation layer that stores the transition, the rendering including:
   (a) altering a graphics state at a time interval;
   (b) painting the identified graphical component for the identified graphics state at the time interval;

(c) repeating (a)-(b) one or more times until the graphics state of the identified graphical component matches the defined end state in a container layer; and rendering the identified graphical component at the defined end state from the container layer, wherein the animation layer and the container layer are separate buffers.

10. The method for rendering effects of graphical components of a graphical user interface (GUI) as recited in claim 9, wherein (c) is performed a number of identified graphics states and each graphics state is illustrated for a period of time to define a transition effect.

11. The method for automated integration of rendering effects with graphical components of a graphical user interface (GUI) as recited in claim 9, wherein determining the transition type is performed by a transition engine.

* * * * *